US010880930B2

(12) United States Patent
Lanante et al.

(10) Patent No.: US 10,880,930 B2
(45) Date of Patent: Dec. 29, 2020

(54) WIRELESS LAN SYSTEM, WIRELESS LAN BASE STATION, WIRELESS LAN TERMINAL, AND COMMUNICATION METHOD

(71) Applicant: NEC CORPORATION, Tokyo (JP)

(72) Inventors: Leonardo Lanante, Fukuoka (JP); Yuhei Nagao, Fukuoka (JP); Hiroshi Ochi, Fukuoka (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/080,157

(22) PCT Filed: Jan. 5, 2017

(86) PCT No.: PCT/JP2017/000134
§ 371 (c)(1),
(2) Date: Aug. 27, 2018

(87) PCT Pub. No.: WO2017/154320
PCT Pub. Date: Sep. 14, 2017

(65) Prior Publication Data
US 2019/0053275 A1 Feb. 14, 2019

(30) Foreign Application Priority Data
Mar. 11, 2016 (JP) .................................. 2016-048277

(51) Int. Cl.
H04W 74/08 (2009.01)
H04W 72/04 (2009.01)
H04W 84/12 (2009.01)

(52) U.S. Cl.
CPC ......... H04W 74/085 (2013.01); H04W 72/04 (2013.01); H04W 72/0413 (2013.01); H04W 72/0446 (2013.01); H04W 84/12 (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 10,028,142 B2 *  7/2018  Kwon .................. H04L 5/0055
10,128,925 B2 * 11/2018  Chun ...................... H04L 29/08
(Continued)

FOREIGN PATENT DOCUMENTS

JP         2017-22702 A        1/2017

OTHER PUBLICATIONS

Ghosh et al; ("Random Access with Trigger Frames using OFDMA", doc.: IEEE 802.11-15/0875r1, Date Jul. 13, 2015).*
(Continued)

Primary Examiner — Peter G Solinsky
Assistant Examiner — Sanjay K Dewan
(74) Attorney, Agent, or Firm — Sughrue Mion, PLLC

(57) ABSTRACT

A wireless LAN system according to the present disclosure includes: a wireless LAN base station (AP); and a plurality of wireless LAN terminals (STA) that perform uplink multi-user communication with the wireless LAN base station (AP). The wireless LAN base station (AP) transmits a trigger frame to allocate a predetermined resource unit, the trigger frame including a terminal ID that specifies a wireless LAN terminal (STA) before association among the plurality of wireless LAN terminals (STA), to the plurality of wireless LAN terminals (STA). The wireless LAN terminal before the association (STA) selects, when the terminal ID that specifies the wireless LAN terminal before the association (STA) is included in the trigger frame, the predetermined resource unit and transmits uplink data to the wireless LAN base station (AP).

9 Claims, 5 Drawing Sheets

| Trigger | UL MU | Trigger | UL MU |
|---|---|---|---|
| RU 1 / AID 1 | STA 1 | RU 1 / AID 1 | STA 1 |
| RU 2 / AID 2 | STA 2 | RU 2 / AID 2 | STA 2 |
| RU 3 / AID 3 | STA 3 | RU 3 / AID 3 | STA 3 |
| RU 4 / AID 0 | STA 5 | RU 4 / UAID 5 | STA 5 |
| RU 5 / AID 0 | Collision | RU 5 / AID 0 | STA X | t1          t2          t3          t4

(58) Field of Classification Search
USPC .......................................................... 370/329
See application file for complete search history.

(56) References Cited

U.S. PATENT DOCUMENTS

| | | | |
|---|---|---|---|
| 10,536,948 B2* | 1/2020 | Asterjadhi | H04W 72/12 |
| 2006/0009232 A1 | 1/2006 | Vakil et al. | |
| 2012/0287877 A1* | 11/2012 | Han | H04W 74/08 |
| | | | 370/329 |
| 2015/0085728 A1* | 3/2015 | Majjigi | H04W 76/28 |
| | | | 370/311 |
| 2015/0092702 A1* | 4/2015 | Chen | H04L 5/0053 |
| | | | 370/329 |
| 2015/0110071 A1* | 4/2015 | Jo | H04W 36/0072 |
| | | | 370/331 |
| 2016/0021682 A1 | 1/2016 | Wang et al. | |
| 2016/0080115 A1* | 3/2016 | Josiam | H04W 72/042 |
| | | | 370/329 |
| 2016/0100408 A1* | 4/2016 | Hedayat | H04L 5/0053 |
| | | | 370/329 |
| 2016/0128102 A1* | 5/2016 | Jauh | H04W 74/0833 |
| | | | 370/329 |
| 2016/0165589 A1* | 6/2016 | Chu | H04W 72/0413 |
| | | | 370/329 |
| 2016/0198445 A1* | 7/2016 | Ghosh | H04L 5/00 |
| | | | 370/329 |
| 2016/0219475 A1* | 7/2016 | Kim | H04W 76/27 |
| 2016/0315681 A1* | 10/2016 | Moon | H04B 7/0621 |
| 2016/0345349 A1* | 11/2016 | Ferdowsi | H04W 72/1268 |
| 2017/0170937 A1* | 6/2017 | Chun | H04L 5/0048 |
| 2017/0223665 A1* | 8/2017 | Chun | H04L 27/26 |
| 2017/0230964 A1* | 8/2017 | Park | H04W 72/0413 |
| 2017/0311310 A1* | 10/2017 | Ryu | H04L 5/0055 |
| 2017/0325178 A1* | 11/2017 | Verma | H04W 52/146 |
| 2017/0332385 A1* | 11/2017 | Shirali | H04W 72/10 |
| 2018/0007661 A1* | 1/2018 | Chun | H04L 1/1861 |
| 2018/0014325 A1* | 1/2018 | Dvory | H04W 72/0446 |
| 2018/0027591 A1* | 1/2018 | Shinohara | H04W 28/0268 |
| | | | 370/329 |
| 2018/0070349 A1* | 3/2018 | Huang | H04L 5/0053 |
| 2019/0274171 A1* | 9/2019 | Viger | H04W 28/0268 |

OTHER PUBLICATIONS

Ahn et al., (Ragarding buffer status of UL-STAs in UL-OFDMA, doc.: IEEE 802.11-15/0881r1, Date: Jul. 14, 2015).*
Kiseon Ryu et al., "UL MU procedure", IEEE 802.11-15/0365r0, Mar. 9, 2015, 16 pages.
Chittabrata Ghosh, et al., "Random Access with Trigger Frames using OFDMA", IEEE 802.11-15/0875r1, Jul. 13, 2015, 16 pages
Robert Stacey, "Specification Framework for TGax", IEEE 802.11-15/0132r15, Jan. 28, 2016, 43 pages.
Woojin Ahn et al., "Regarding buffer status of UL-STAs in UL-OFDMA", IEEE 802.1 1-15/0881r1, Jul. 14, 2015, 17 pages
International Search Report for PCT/JP2017/000134, dated Feb. 28, 2017.
Communication dated Aug. 6, 2019 from Japanese Patent Office in counterpart JP Application No. 2018-504015.
Communication dated Aug. 28, 2019 from European Patent Office in counterpart EP Application No. 17762667.8.

* cited by examiner

WIRELESS LAN SYSTEM, WIRELESS LAN BASE STATION, WIRELESS LAN TERMINAL, AND COMMUNICATION METHOD

CROSS REFERENCE TO RELATED APPLICATIONS

This Application is a National Stage of International Application No. PCT/JP2017/000134 filed Jan. 5, 2017, claiming priority based on Japanese Patent Application No. 2016-048277 filed Mar. 11, 2016, the disclosure of which is incorporated herein in its entirety by reference.

TECHNICAL FIELD

The present disclosure relates to a wireless Local Area Network (LAN) system, a wireless LAN base station, a wireless LAN terminal, and a communication method.

BACKGROUND ART

In wireless LAN standard specification Institute of Electrical and Electronics Engineers (IEEE) 802.11, a next-generation communication system 802.11ax (HEW: High Efficiency Wireless LAN (WLAN)) has been discussed by a task group TGax. In the next-generation communication system 802.11ax, regarding element technologies, employment of a new modulation/demodulation system (1024 Quadrature Amplitude Modulation (QAM)), support of uplink Multi User Multi-Input Multi-Output (MU-MIMO), introduction of Orthogonal frequency-division multiple access (OFDMA) and the like will be advanced.

FIG. 1 is a diagram showing a basic configuration example of a wireless LAN system. This wireless LAN system includes an Access Point AP and a plurality of terminals STA 1-STA n. In the following description, the terminals STA 1-STA n are simply referred to as a terminal STA when it is not necessary to specify one of them. While three terminals STA are shown as an example in FIG. 1, it is sufficient that the number of terminals STA be two or larger (that is, n is two or larger). The access point AP and the plurality of terminals STA 1-STA n form a network called a Basic Service Set (BSS).

In communication (DCF: Distributed Coordination Function) by Carrier Sense Multiple Access with Collision Avoidance (CSMA/CA) which is a typical communication mode in IEEE 802.11, only one terminal STA can communicate with the access point AP in the uplink at one time in one BSS. In Uplink Multi-user (UL MU) communication of uplink OFDMA or uplink MU-MIMO that will be introduced in IEEE 802.11ax (HEW), the access point AP intensively controls the plurality of terminals STA 1-STA n, divides the communication resources into a plurality of resource units (RUs), and allocates the resource units to the plurality of terminals STA 1-STA n. Accordingly, the plurality of terminals STA 1-STA n are able to concurrently perform communication.

With reference to FIG. 2, the procedure of the uplink multi-user communication will be explained (see Non-Patent Literature 1).

Step 1:

The terminal STA notifies in advance the access point AP of a buffer status indicating that there is uplink data that has not yet been transmitted.

Step 2:

The access point AP transmits a trigger frame to allocate the resource units RU to the plurality of terminals STA 1-STA n in the BSS (time t1). In this example, it is assumed that four resource units RU are reported. The access point AP allocates the four resource units RU to respective terminals STA. Therefore, the access point AP includes information on the four resource units RU and terminal Identifiers (IDs) (e.g., Association IDs (AIDs)) that specify the respective terminals STA to which the four resource units RU are allocated in the trigger frame. When the terminal ID that specifies the terminal STA is included in the trigger frame, the terminal STA transmits a UL MU Physical Layer Convergence Protocol (PLCP) Protocol Data Unit (PPDU) frame including the uplink data to the access point AP using the resource unit RU allocated to the terminal STA (time t2). In this example, four terminals STA 1-STA 4 transmit the uplink data to the access point AP.

Step 3:

The access point AP transmits an Acknowledgement frame (ACK frame) for reporting whether the communication has been successfully performed to the plurality of terminals STA 1-STA n in the BSS (time t3).

In the uplink multi-user communication described with reference to FIG. 2, however, there is a problem that the terminal STA cannot necessarily notify the access point AP of the buffer status in advance. Further, when AID is used as the terminal ID, there is a problem that the terminal STA before the association cannot perform uplink multi-user communication (see Non-Patent Literature 2).

In particular, the problem that the terminal STA before the association cannot perform uplink multi-user communication is extremely serious. This is because, in an environment in which congestion of the wireless LAN communication is high, the percentage of traffic of management frames (Association Request, Probe Request etc.) that the terminal STA before the association transmits is large.

In order to solve this problem, a random access method in uplink multi-user communication has been discussed (see clause 4.5 of Non-Patent Literature 3).

With reference to FIG. 3, the random access procedure in the uplink multi-user communication will be explained. The random access procedure described in the following description is a procedure that can be applied to both uplink multi-user communication of the uplink OFDMA and that of the uplink MU-MIMO.

Step 1:

The terminal STA where there is uplink data that has not yet been transmitted sets an initial value in a back-off counter of itself. The initial value is a value randomly selected from the values in a range from 0 to the maximum count value of the back-off counter.

Step 2:

The access point AP transmits a Trigger Frame for Random access (TF-R) to allocate the resource units RU to the plurality of terminals STA 1-STA n in the BSS (time t1). In this example, the access point AP reports five resource units RU 1-RU 5. Further, the access point AP does not allocate the resource units RU 1-RU 5 to specific terminals STA and sets them to be randomly accessible. Therefore, the access point AP includes information on the resource units RU 1-RU 5 and a special terminal ID (in the example shown in FIG. 3, AID 0) indicating that each of the resource units RU 1-RU 5 is randomly accessible in the trigger frame for random access. The terminal STA which has a value in which the count value of the back-off counter is other than 0 decrements the count value for each predetermined period of time by the amount corresponding to five, which is the number of resource units RU 1-RU 5 in which the special terminal ID has been specified. As a result, the terminal STA whose count value has reached 0 selects one resource unit RU and transmits the UL MU PPDU frame including the uplink data to the access point AP using the selected resource unit RU (time t2). In this example, the terminal STA 2 transmits the uplink data using the resource unit RU 1 and the terminal STA 1 transmits the uplink data using the resource unit RU 3.

Step 3:

The access point AP transmits the ACK frame for reporting whether the communication has been successfully performed to the plurality of terminals STA 1-STA n in the BSS (time t3). If the initial value randomly set in the back-off counter in one terminal STA is the same as that in another terminal STA, collision of the uplink data may occur at time t2. If the terminal STA has not successfully performed communication due to a cause such as collision of the uplink data, the terminal STA can recognize, from the ACK frame, that the communication has not been successfully performed. Therefore, the terminal STA in which communication has not been successfully performed goes back to Step 1, sets a random initial value in the back-off counter again, and waits for a chance to re-transmit the uplink data.

CITATION LIST

Non-Patent Literature

[Non-Patent Literature 1] IEEE 802.11-15/0365r0, "UL MU procedure", 2015 Mar. 9
[Non-Patent Literature 2] IEEE 802.11-15/0875r1, "Random Access with Trigger Frames using OFDMA", 2015 Jul. 13
[Non-Patent Literature 3] IEEE 802.11-15/0132r15, "Specification Framework for TGax", 2016 Jan. 28

SUMMARY OF INVENTION

Technical Problem

However, since it is possible that collision of the uplink data may occur in the procedure of the random access in the uplink multi-user communication described with reference to FIG. 3, there is a problem that the communication efficiency is extremely low.

One of the objects of the present disclosure is to provide a wireless LAN system, a wireless LAN base station, a wireless LAN terminal, and a communication method capable of improving communication efficiency in uplink multi-user communication.

Solution to Problem

In one aspect, a wireless Local Area Network (LAN) system includes:
a wireless LAN base station; and
a plurality of wireless LAN terminals that perform uplink multi-user communication with the wireless LAN base station, in which
the wireless LAN base station transmits a trigger frame to allocate a predetermined resource unit, the trigger frame including a terminal Identifier (ID) that specifies a wireless LAN terminal before association among the plurality of wireless LAN terminals, to the plurality of wireless LAN terminals, and the wireless LAN terminal before the association selects, when the temporary terminal ID that specifies the wireless LAN terminal before the association is included in the trigger frame, the predetermined resource unit and transmits uplink data to the wireless LAN base station.

In one aspect, a wireless Local Area Network (LAN) base station is a wireless LAN base station that performs uplink multi-user communication with a plurality of wireless LAN terminals, the wireless LAN base station including:
a communication unit; and
a processor, in which
the processor generates a trigger frame to allocate a predetermined resource unit, the trigger frame including a terminal Identifier (ID) that specifies a wireless LAN terminal before association among the plurality of wireless LAN terminals, and
the communication unit transmits the trigger frame to the plurality of wireless LAN terminals.

In one aspect, a wireless Local Area Network (LAN) terminal is one of a plurality of wireless LAN terminals that perform uplink multi-user communication with a wireless LAN base station, the wireless LAN terminal including:
a communication unit; and
a processor, in which
the processor determines whether the wireless LAN terminal is a wireless LAN terminal before association and whether a trigger frame to allocate a predetermined resource unit, the trigger frame being received from the wireless LAN base station, includes a terminal Identifier (ID) that specifies the wireless LAN terminal, and
the communication unit selects the predetermined resource unit based on the determination and transmits uplink data to the wireless LAN base station.

In one aspect, a communication method is a communication method by a wireless LAN base station that performs uplink multi-user communication with a plurality of wireless Local Area Network (LAN) terminals, the method including transmitting a trigger frame to allocate a predetermined resource unit, the trigger frame including a terminal Identifier (ID) that specifies a wireless LAN terminal before association among the plurality of wireless LAN terminals, to the plurality of wireless LAN terminals.

In another aspect, a communication method is a communication method by one of a plurality of wireless LAN terminals that perform uplink multi-user communication with a wireless Local Area Network (LAN) base station, the method including selecting, when the wireless LAN terminal is a wireless LAN terminal before association and a trigger frame to allocate a predetermined resource unit, the trigger frame being received from the wireless LAN base station, includes a terminal Identifier (ID) that specifies the wireless LAN terminal, the predetermined resource unit and transmits uplink data to the wireless LAN base station.

Advantageous Effects of Invention

According to the aforementioned aspects, it is possible to obtain an effect that it is possible to improve communication efficiency in uplink multi-user communication.

DESCRIPTION OF EMBODIMENTS

Hereinafter, with reference to the drawings, embodiments of the present disclosure will be explained.

Figure 4:
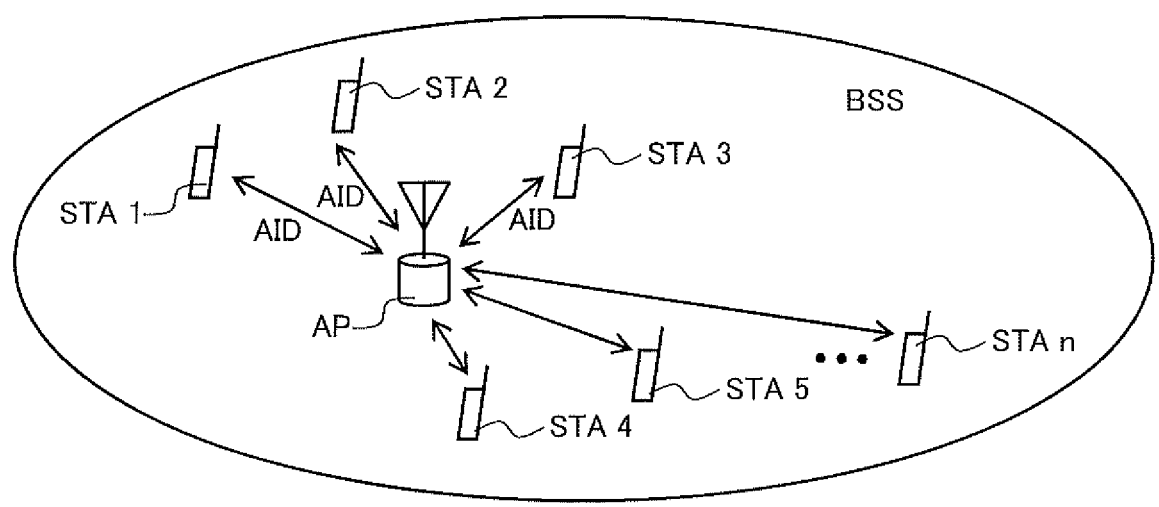
FIG. 4 is a diagram showing a configuration example of the wireless LAN system in some aspects.

FIG. 4 is a diagram showing a configuration example of a wireless LAN system in some aspects. The wireless LAN system in some aspects includes an access point AP and a plurality of terminals STA 1-STA n. The access point AP is one example of the wireless LAN base station and each of the terminals STA 1-STA n is an example of the wireless LAN terminal. In the following description, the terminals STA 1-STA n are simply referred to as a terminal STA when it is not necessary to specify one of them. While six terminals STA are shown as an example in FIG. 4, the number of terminals STA may be two or larger (that is, n may be two or larger). The access point AP and the terminals STA 1-STA n form a BSS. Further, the wireless LAN system in some aspects can be applied to both uplink multi-user communication of the uplink OFDMA and that of the uplink MU-MIMO.

It is assumed that the terminals STA 1-STA 3 are terminals STA that have already been associated with the access point AP and the terminals STA 4 and STA 5 are terminals STA before the association with the access point AP. As shown in the following Table 1, AID 1-AID 3 are set in the terminals STA 1-STA 3 that have already been associated as terminal IDs, whereas AIDs have not been set in the terminals STA 4 and STA 5 before the association.

TABLE 1

| STA | AID |
|-----|-----|
| 1   | 1   |
| 2   | 2   |
| 3   | 3   |
| 4   | —   |
| 5   | —   |

Figure 1:
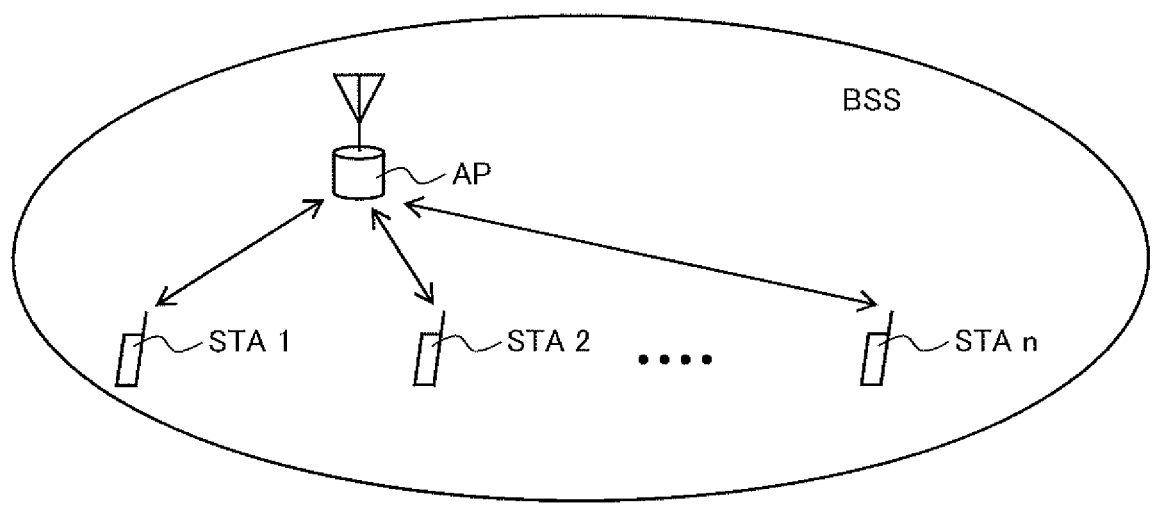
FIG. 1 is a diagram showing a basic configuration example of a wireless LAN system.
Figure 2:
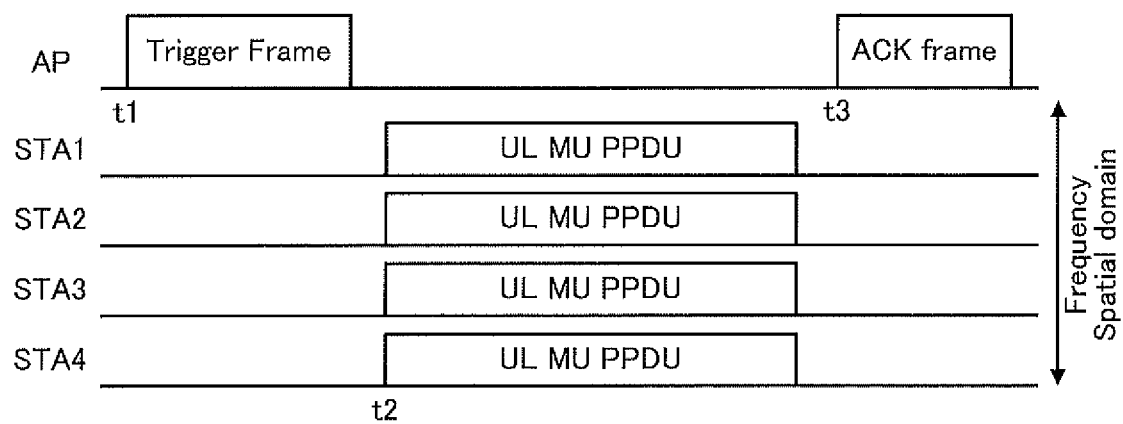
FIG. 2 is a diagram for describing a procedure of an uplink multi-user communication.
Figure 3:
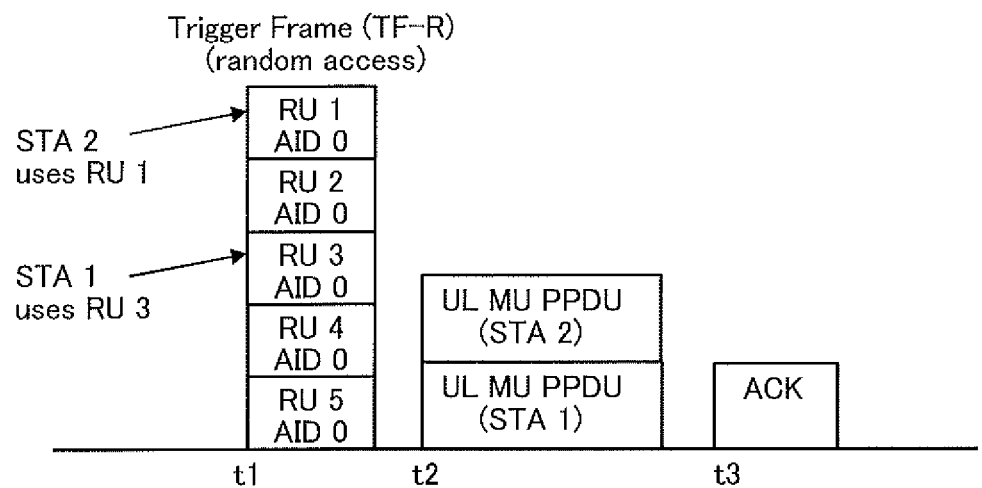
FIG. 3 is a diagram for describing a procedure of a random access in the uplink multi-user communication.

As described above, the communication efficiency of the random access procedure in the uplink multi-user communication described with reference to FIG. 3 is extremely low. Further, since the terminals STA before the association can participate in only the random access, the communication efficiency thereof is kept to be low until they are associated with the access point AP.

In order to solve the aforementioned problem, in some aspects, by introducing a temporary terminal ID that specifies the terminal STA before the association, communication efficiency is improved. In the following description, the temporary terminal ID that specifies the terminal STA before the association will be explained.

(1) Temporary Terminal ID (1-1) Example 1 of Temporary Terminal ID

Figure 5:
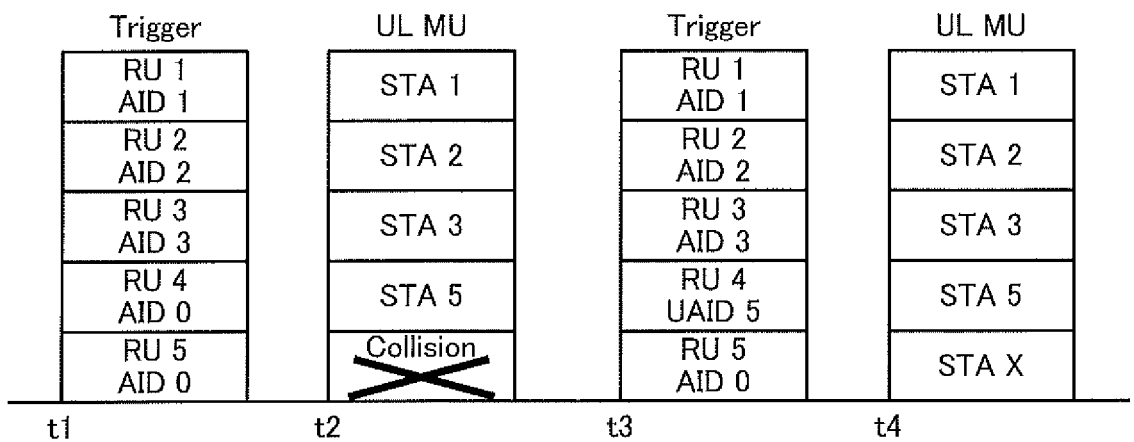
FIG. 5 is a diagram for describing Example 1 of a temporary terminal ID that specifies a terminal before association in some aspects.

FIG. 5 is a diagram for describing Example 1 of the temporary terminal ID that specifies the terminal STA before the association in some aspects.

At time t1, the access point AP transmits a trigger frame that reports resource units RU to the plurality of terminals STA 1-STA n in the BSS. In the Example 1, at time t1, the access point AP reports five resource units RU 1-RU 5. Further, while the access point AP respectively allocates the resource units RU 1-RU 3 to the terminals STA 1-STA 3 that have already been associated, the access point AP does not allocate the resource units RU 4 and RU 5 to specific terminals STA and sets them to be randomly accessible. The access point AP includes in the trigger frame at time t1, information on the resource units RU 1-RU 5, AID 1-AID 3 that specify the terminals STA 1-STA 3 to which the resource units RU 1-RU 3 are allocated, and AID 0, which is a special value indicating that the resource units RU 4 and RU 5 are randomly accessible.

The trigger frame at time t1 includes AID 1-AID 3 that specify the terminals STA 1-STA 3 to which the resource units RU 1-RU 3 are allocated. At time t2, the terminals STA 1-STA 3 specified by AID 1-AID 3 transmit a UL MU PPDU frame including uplink data to the access point AP using the resource units RU 1-RU 3 allocated to the terminals STA 1-STA 3, respectively. Further, the trigger frame at time t1 includes AID 0 indicating that the resource units RU 4 and RU 5 are randomly accessible. Therefore, in the Example 1, at time t2, the terminal STA 5 accesses the resource unit RU 4 and acquires the right to access the resource unit RU 4, and transmits the UL MU PPDU frame including the uplink data to the access point AP using the resource unit RU 4. In the Example 1, collision of the uplink data occurs in the resource unit RU 5, where a correct communication has not been performed. As described above, in the UL MU PPDU frame at time t2, two resource units RU 4 and RU 5 are randomly accessible, and thus it is possible that collision of the uplink data may occur. Therefore, communication efficiency is low. After that, the access point AP transmits the ACK frame for reporting whether the communication has been successfully performed to the plurality of terminals STA 1-STA n in the BSS.

At time t3, the access point AP transmits the trigger frame that reports the resource units RU to the plurality of terminals STA 1-STA n in the BSS. In the Example 1, at time t3, the access point AP reports five resource units RU 1-RU 5, similar to the trigger frame at time t1. The access point AP respectively allocates the resource units RU 1-RU 3 to the terminals STA 1-STA 3 that have already been associated, and does not allocate the resource unit RU 5 to a specific terminal STA and sets it to be randomly accessible. In an aspect, as an example in which there is still uplink data that has not yet been transmitted in the terminal STA 5 before the association, the access point AP allocates the resource unit RU 4 to the terminal STA 5 before the association. Since the terminal STA 5 is the terminal STA before the association, AID has not been set in the terminal STA 5.

In the Example 1, the access point AP specifies the terminal STA 5 before the association by the temporary terminal ID capable of specifying the terminal STA 5, as shown by UAID 5 in FIG. 5. The UAID 5 may be designed in such a way that the values independently generated by the access point AP and the terminal STA 5 coincide with each other. For example, the access point AP and the terminal STA 5 may process a Media Access Control (MAC) address of the terminal STA 5 in a predetermined process and generate UAID 5 in such a way that it is within an information element (14 bits) that stores AID in the trigger frame. As another example, the access point AP and the terminal STA 5 may add one bit or more to the normal AID value and generate information indicating that it is the temporary terminal ID as UAID 5. However, the access point AP and the terminal STA 5 need to generate UAID 5 in such a way that UAID 5 can be differentiated from the normal AID value. After the terminal STA 5 is associated with the access point AP and the AID value is set in the terminal STA 5, the access point AP and the terminal STA 5 delete UAID 5 and completes management of UAID 5.

From the aforementioned discussion, the access point AP includes information on the resource units RU 1-RU 5, AID 1-AID 3 that specify the terminals STA 1-STA 3 to which the resource units RU 1-RU 3 are allocated, UAID 5 that is the temporary terminal ID that specifies the terminal STA 5 to which the resource unit RU 4 is allocated, and AID 0 indicating that the resource unit RU 5 is randomly accessible in the trigger frame at time t3.

The trigger frame at time t3 includes AID 1-AID 3 that specify the terminals STA 1-STA 3 to which the resource units RU 1-RU 3 are allocated. At time t4, the terminals STA 1-STA 3 specified by AID 1-AID 3 transmit the UL MU PPDU frame including the uplink data to the access point AP using the resource units RU 1-RU 3 allocated to the terminals STA 1-STA 3, respectively. Further, the trigger frame at time t3 includes UAID 5, which is the temporary terminal ID that specifies the terminal STA 5 to which the resource unit RU 4 is allocated. The terminal STA 5 also generates UAID 5 as the temporary terminal ID that specifies itself and compares the generated UAID 5 with the terminal ID transmitted from the access point AP. In the Example 1, since the terminal ID transmitted from the access point AP is UAID 5, the terminal STA 5 determines that the terminal ID that specifies itself is included in the trigger frame. The terminal STA 5 specified in UAID 5 transmits the UL MU PPDU frame including the uplink data to the access point AP using the resource unit RU 4 allocated to itself. Further, the trigger frame at time t3 includes AID 0 indicating that the resource unit RU 5 is randomly accessible. In the Example 1, a terminal STA X other than the terminals STA 1-STA 3 and STA 5 accesses the resource unit RU 5, acquires the right to access the resource unit RU 5, and transmits the UL MU PPDU frame including the uplink data to the access point AP using the resource unit RU 5. As described above, in the UL MU PPDU frame at time t4, it is possible to allocate the resource unit RU 4 to the terminal STA 5 before the association. Therefore, collision of the uplink data does not occur in the resource unit RU 4. As a result, since collision of the uplink data may occur only in the randomly accessible resource unit RU 5, communication efficiency is improved. After that, the access point AP transmits the ACK frame for reporting whether the communication has been successfully performed to the plurality of terminals STA 1-STA n in the BSS.

The terminal STA X that has transmitted the uplink data using the resource unit RU 5 at time t4 may be specified by UAID even when the terminal STA X is the terminal STA before the association. The access point AP is therefore able to allocate the resource unit RU 5 to the terminal STA X next time. As a result, since collision of the uplink data does not occur also in the resource unit RU 5 next time, communication efficiency is further improved.

(1-2) Example 2 of Temporary Terminal ID

Figure 6:
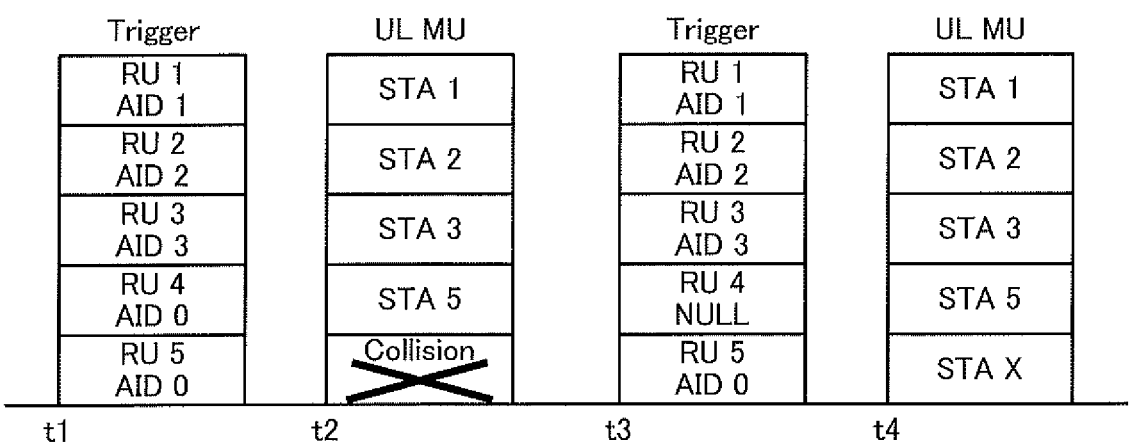
FIG. 6 is a diagram for describing Example 2 of the temporary terminal ID that specifies the terminal before association in some aspects.

FIG. 6 is a diagram for describing Example 2 of the temporary terminal ID that specifies the terminal STA before the association in some aspects.

The transmission of the trigger frame at time t1 and the transmission of the UL MU PPDU frame at time t2 are similar to those shown in FIG. 5. Further, similar to FIG. 5, it is assumed that the access point AP transmits the ACK frame after the transmission of the UL MU PPDU frame at time t2.

At time t3, the access point AP transmits the trigger frame that reports the resource units RU to the plurality of terminals STA 1-STA n in the BSS. In this example, the access point AP reports the five resource units RU 1-RU 5, similar to the trigger frame at time t1. The access point AP respectively allocates the resource units RU 1-RU 3 to the terminals STA 1-STA 3 that have already been associated, and does not allocate the resource unit RU 5 to a specific terminal STA and sets it to be randomly accessible. On the other hand, as an example in which there is still uplink data that has not yet been transmitted in the terminal STA 5 before the association, the access point AP allocates the resource unit RU 4 to the terminal STA 5 before the association. Since the terminal STA 5 is the terminal STA before the association, AID has not been set in the terminal STA 5.

In the Example 2, the access point AP specifies the terminal STA 5 before the association by the temporary terminal ID which is specially defined and serves as a common value common to the plurality of terminals STA 1-STA n, as shown by NULL in FIG. 6. The temporary terminal ID (e.g., NULL) may be the AID value in which all the bits are 0 or other bits equal to one or larger. The access point AP includes NULL, which is the temporary terminal ID that specifies the terminal STA 5 to which the resource unit RU 4 is allocated, in the trigger frame at time t3. However, since NULL is a common value, even when the terminal STA 5 receives the trigger frame including NULL, the terminal STA 5 cannot determine whether NULL directly specifies the terminal STA 5. However, the terminal STA 5 is able to recognize, from the ACK frame received from the access point AP just before time t3, that the transmission of the uplink data at time t2 has been successfully performed.

The terminal STA 5 is therefore able to indirectly know that NULL specifies the terminal STA 5. The common value, which serves as the temporary terminal ID, is not limited to NULL. However, the access point AP needs to generate a common value in such a way that it can be differentiated from the normal AID value.

From the aforementioned discussion, the access point AP includes information on the resource units RU 1-RU 5, AID 1-AID 3 that specify the terminals STA 1-STA 3 to which the resource units RU 1-RU 3 are allocated, NULL that is the temporary terminal ID that specifies the terminal STA 5 to which the resource unit RU 4 is allocated, and AID 0 indicating that the resource unit RU 5 is randomly accessible in the trigger frame at time t3.

The trigger frame at time t3 includes AID 1-AID 3 that specify the terminals STA 1-STA 3 to which the resource units RU 1-RU 3 are allocated. At time t4, the terminals STA 1-STA 3 specified by AID 1-AID 3 transmit the UL MU PPDU frame including the uplink data to the access point AP using the resource units RU 1-RU 3 allocated to the terminals STA 1-STA 3, respectively. Further, the trigger frame at time t3 includes NULL, which is the temporary terminal ID that specifies the terminal STA 5 to which the resource unit RU 4 is allocated. However, even when the terminal STA 5 receives the trigger frame including NULL, which is a common value, the terminal STA 5 cannot determine whether NULL directly specifies the terminal STA 5. However, the terminal STA 5 is able to recognize, from the ACK frame received just before time t3, that the transmission of the uplink data at time t2 has been successfully performed. The terminal STA 5 is therefore able to determine that NULL specifies the terminal STA 5. Therefore, the terminal STA 5 specified by NULL transmits the UL MU PPDU frame including the uplink data to the access point AP using the resource unit RU 4 allocated to itself. Further, the trigger frame at time t3 includes AID 0 indicating that the resource unit RU 5 is randomly accessible. Therefore, in this example, a terminal STA X other than the terminals STA 1-STA 3 and STA 5 accesses the resource unit RU 5, acquires the right to access the resource unit RU 5, and transmits the UL MU PPDU frame including the uplink data to the access point AP using the resource unit RU 5. As described above, in the UL MU PPDU frame at time t4, it is possible to allocate the resource unit RU 4 to the terminal STA 5 before the association. Therefore, collision of the uplink data does not occur in the resource unit RU 4. As a result, since collision of the uplink data may occur only in the randomly accessible resource unit RU 5, communication efficiency is improved. After that, the access point AP transmits the ACK frame for reporting whether the communication has been successfully performed to the plurality of terminals STA 1-STA n in the BSS.

The terminal STA X that has transmitted the uplink data using the resource unit RU 5 at time t4 may be specified by NULL even when the terminal STA X is the terminal STA before the association. Further, the terminal STA X is able to determine, from the ACK frame received from the access point AP, that the transmission of the uplink data that uses the resource unit RU 5 at time t4 has been successfully performed. The access point AP is therefore able to allocate the resource unit RU 5 to the terminal STA X next time. As a result, since collision of the uplink data does not occur also in the resource unit RU 5 next time, communication efficiency is further improved.

As described above, in some aspects, the temporary terminal ID that specifies the terminal STA before the association is introduced. When the access point AP allocates the resource unit RU to the terminal STA before the association, the access point AP includes the temporary terminal ID that specifies the terminal STA before the association in the trigger frame that reports the resource unit RU.

As described above, the access point AP is able to specify the terminal STA before the association by the temporary terminal ID and to allocate the resource unit RU, whereby the terminal STA before the association is able to participate in the uplink multi-user communication and transmit the uplink data to the access point AP using a procedure other than the random access. It is therefore possible to improve communication efficiency.

While the terminal STA transmits the UL MU PPDU frame including the uplink data at time t2 in FIGS. 5 and 6, the information that the terminal STA transmits is not limited thereto. The UL MU PPDU frame at time t2 may include a buffer status indicating that there is uplink data that has not yet been transmitted instead of including the uplink data. Otherwise, besides the uplink data, the buffer status may be included. When the uplink data and the buffer status are included in the UL MU PPDU frame, this buffer status indicates that there is still uplink data that has not yet been transmitted other than the uplink data transmitted along with the buffer status.

Further, in some aspects, by introducing two-stage uplink multi-user communication, communication efficiency is further improved. In the following description, two-stage uplink multi-user communication will be explained.

(2) Two-Stage Uplink Multi-User Communication

Figure 7:
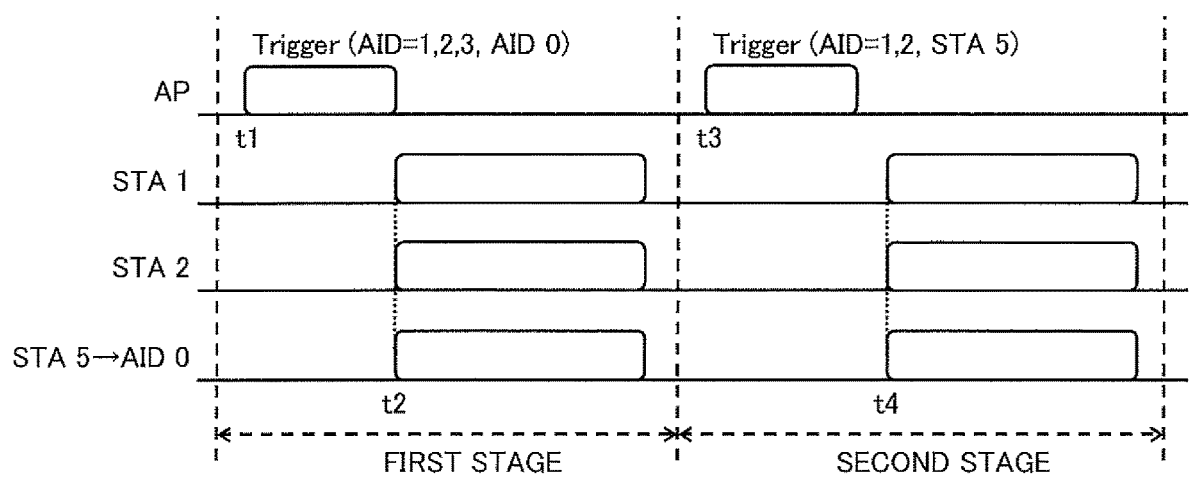
FIG. 7 is a diagram for describing an example of two-stage uplink multi-user communication in some aspects.

FIG. 7 is a diagram for describing an example of the two-stage uplink multi-user communication between the access point AP and the plurality of terminals STA 1-STA n in some aspects.

In some aspects, the uplink multi-user communication between the access point AP and the plurality of terminals STA 1-STA n is performed by two stages, that is, a first stage and a second stage. In the following description, an explanation will be given on the assumption that there are five resource units RU 1-RU 5.

(2-1) First Stage

In the first stage, random access by uplink multi-user communication is performed.

The access point AP respectively allocates the resource units RU 1-RU 3 to the terminals STA 1-STA 3 that have already been associated. However, the access point AP does not allocate the resource units RU 4 and RU 5 to specific terminals STA and sets them to be randomly accessible. At time t1, the access point AP includes information on the resource units RU 1-RU 5, AID 1-AID 3 that specify the terminals STA 1-STA 3 to which the resource units RU 1-RU 3 are allocated, and AID 0 indicating that the resource units RU 4 and RU 5 are randomly accessible in the trigger frame and transmits this trigger frame to the plurality of terminals STA 1-STA n in the BSS.

In this example, it is assumed that there is uplink data that has not yet been transmitted in the terminals STA 1 and STA 2 that have already been associated and the terminal STA 5 before the association.

At time t2, upon receiving the trigger frame from the access point AP, the terminals STA 1 and STA 2 specified by AID 1 and AID 2 transmit the UL MU PPDU frame to the access point AP using the resource units RU 1 and RU 2 allocated to the terminals STA 1 and STA 2, respectively. In this example, the terminal STA 5 accesses the resource unit RU 4 indicated by AID 0 and acquires the right to access the resource unit RU 4. Therefore, the terminal STA 5 transmits the UL MU PPDU frame including the buffer status, not the uplink data, to the access point AP using the resource unit RU 4. As described above, in the UL MU PPDU frame at time t2, two resource units RU 4 and RU 5 are randomly accessible, and it is possible that collision of the uplink data may occur. Therefore, communication efficiency is low. However, since the amount of data of the buffer status itself is small, time required for the communication in the first stage, that is, time during which the communication efficiency is low, can be made short.

The access point AP recognizes that there is a terminal STA 5 before the association and also recognizes, from the transmission of the buffer status, that there is uplink data that has not yet been transmitted. Therefore, the access point AP includes the temporary terminal ID that specifies the terminal STA 5 to which the resource unit RU 4 is allocated in the trigger frame that is transmitted in the second stage. After that, the access point AP transmits the ACK frame for reporting whether the communication has been successfully performed to the plurality of terminals STA 1-STA n in the BSS. The terminal STA 5 is able to know whether the buffer status has been successfully transmitted to the access point AP at time t2 by the ACK frame received from the access point AP.

(2-2) Second Stage

In the second stage, the uplink multi-user communication is performed.

The access point AP respectively allocates the resource units RU 1 and RU 2 to the terminals STA 1 and STA 2 that have already been associated and further allocates the resource unit RU 4 to the terminal STA 5 before the association that has transmitted the buffer status. At time t3, the access point AP includes information on the resource units RU 1-RU 5, AID 1 and AID 2 that specify the terminals STA 1 and STA 2 to which the resource units RU 1 and RU 2 are allocated, and the aforementioned temporary terminal ID (e.g., UAID 5 or NULL) that specifies the terminal STA 5 to which the resource unit RU 4 is allocated in the trigger frame and transmits this trigger frame to the plurality of terminals STA 1-STA n in the BSS. The access point AP may set the resource units RU 3 and RU 5 to be randomly accessible or may allocate the resource units RU 3 and RU 5 to specific terminals STA. The access point AP includes information indicating that the resource units RU 3 and RU 5 should be set to be randomly accessible or that the resource units RU 3 and RU 5 should be allocated to specific terminals STA in the trigger frame at time t3.

At time t4, upon receiving the trigger frame from the access point AP, the terminals STA 1 and STA 2 specified by AID 1 and AID 2 transmit the UL MU PPDU frame including the uplink data to the access point AP using the resource units RU 1 and RU 2 allocated to the terminals STA 1 and STA 2, respectively. Since the terminal STA 5 itself is specified by the temporary terminal ID, it is possible to determine that the resource unit RU 4 has been allocated to the terminal STA 5. Therefore, the terminal STA 5 also transmits the UL MU PPDU frame including the uplink data to the access point AP using the resource unit RU 4 allocated to itself. After that, the access point AP transmits the ACK frame for reporting whether the communication has been successfully performed to the plurality of terminals STA 1-STA n in the BSS. As described above, in the communication in the second stage, the access point AP is able to allocate the resource unit RU 4 to the terminal STA 5 before the association. Therefore, collision of the uplink data does not occur in the resource unit RU 4. As a result, communication efficiency is improved. Accordingly, by performing the communication in the second stage by taking time longer than that in the communication in the first stage, total communication efficiency can be improved.

As described above, in some aspects, the uplink multi-user communication is performed by the two stages, that is, the first stage and the second stage. In the first stage, the access point AP includes the special value indicating that the resource unit RU is randomly accessible in the trigger frame and transmits this trigger frame, and the terminal STA before the association transmits the buffer status using the resource unit RU. In the second stage, the access point AP allocates the resource unit RU to the terminal STA before the association that has transmitted the buffer status in the first stage, includes the temporary terminal ID that specifies the terminal STA before the association in the trigger frame, and transmits this trigger frame.

Therefore, in the communication in the second stage, collision of the uplink data does not occur, whereby it is possible to improve communication efficiency. Accordingly, by performing the communication in the second stage by taking time longer than that in the communication in the first stage, total communication efficiency can be improved.

While the terminal STA transmits the UL MU PPDU frame including the buffer status at time t2 in FIG. 7, the information that the terminal STA transmits is not limited thereto. The UL MU PPDU frame may include, besides the buffer status, the uplink data. When the uplink data and the buffer status are included in the UL MU PPDU frame, this buffer status indicates that there is uplink data that has not yet been transmitted other than the uplink data transmitted along with the buffer status.

Figure 8:
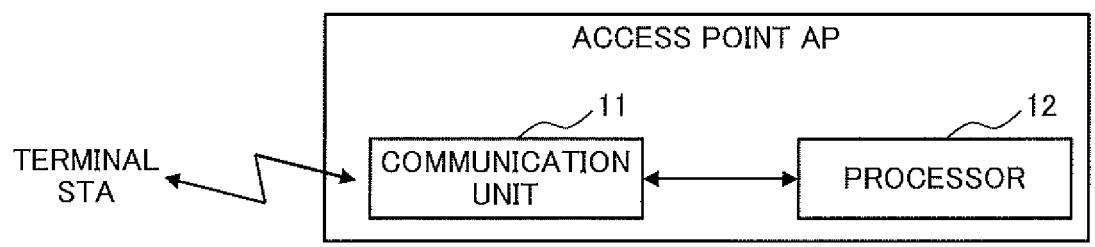
FIG. 8 is a block diagram showing a configuration example of an access point in some aspects.

A configuration example of the access point AP in some aspects will be explained. FIG. 8 is a block diagram showing a configuration example of the access point AP in some aspects.

The access point AP includes a communication unit 11 and a processor 12. The processor 12, which is a Central Processing Unit (CPU) or the like, achieves the aforementioned processing of the access point AP by executing a program stored in a memory.

The communication unit 11 is configured to perform radio communication, more specifically, uplink multi-user communication, with the plurality of terminals STA.

The processor 12, which is coupled to the communication unit 11, is configured to control the communication unit 11 and perform the aforementioned processing of the access point AP.

For example, the processor 12 generates the trigger frame to allocate a predetermined resource unit RU, the trigger frame including the terminal ID that specifies the terminal STA before the association among the plurality of terminals STA.

The communication unit 11 transmits the trigger frame generated by the processor 12 to a plurality of terminals STA.

Figure 9:
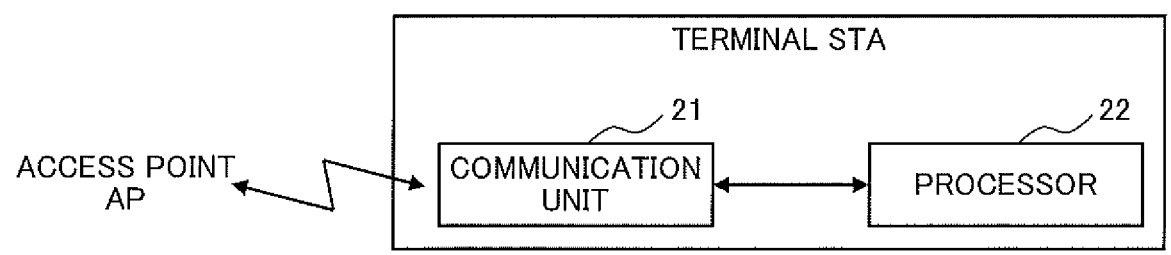
FIG. 9 is a block diagram showing a configuration example of a terminal in some aspects.

A configuration example of the terminal STA in some aspects will be explained. FIG. 9 is a block diagram showing a configuration example of the terminal STA in some aspects.

The terminal STA includes a communication unit 21 and a processor 22. The processor 22, which is a CPU or the like, achieves the aforementioned processing of the terminal STA by executing a program stored in a memory (not shown).

The communication unit 21 is configured to perform radio communication, more specifically, uplink multi-user communication, with the access point AP.

The processor 22, which is coupled to the communication unit 21, is configured to control the communication unit 21 and perform the aforementioned processing of the terminal STA.

For example, the processor 22 determines whether the processor 22 itself is the terminal STA before the association and whether the temporary terminal ID that specifies itself is included in the trigger frame to allocate a predetermined resource unit RU, the trigger frame being received from the access point AP.

The communication unit 21 selects a predetermined resource unit RU based on the determination in the processor 22 and transmits the uplink data to the access point AP.

The aforementioned programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-Recordable (CD-R), CD-Rewritable (CD-R/W), and semiconductor memories (such as mask ROM, Programmable ROM (PROM), Erasable PROM (EPROM), flash ROM, Random Access Memory (RAM), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While various aspects in the present disclosure have been described above with reference to the embodiments, the present disclosure is not limited to them. Various changes that may be understood by one ordinary skilled in the art may be made to the configuration and the details in each aspect of the present application within the scope of the present disclosure.

This application is based upon and claims the benefit of priority from Japanese Patent Application No. 2016-048277, filed on Mar. 11, 2016, the disclosure of which is incorporated herein in its entirety by reference.

REFERENCE SIGNS LIST

AP ACCESS POINT
STA, STA 1-STA n TERMINAL
RU 1-RU 5 RESOURCE UNIT
11 COMMUNICATION UNIT
12 PROCESSOR
21 COMMUNICATION UNIT
22 PROCESSOR

The invention claimed is:

1. A wireless Local Area Network (LAN) system comprising:
   a wireless LAN base station; and
   a wireless LAN terminal before association with the wireless LAN base station and configured to perform uplink multi-user communication with the wireless LAN base station, wherein
   the wireless LAN base station is configured to transmit a trigger frame comprising a first association identifier (AID) which is common to wireless LAN terminals after association with the wireless LAN base station and associated with a first resource unit for random access by the wireless LAN terminals after association and a second association identifier (AID) which is common to wireless LAN terminals before association with the wireless LAN base station and associated with a second resource unit for random access by the wireless LAN terminals before association, and
   the wireless LAN terminal before association is configured to, in a case where the second AID is included in the trigger frame, transmit uplink data to the wireless LAN base station using the second resource unit for random access.

2. The wireless LAN system according to claim 1, wherein the second AID comprises a value that corresponds to a Media Access Control (MAC) address of the wireless LAN terminal before the association.

3. The wireless LAN system according to claim 1, wherein
   the wireless LAN terminal before the association is one of a plurality of wireless LAN terminals,
   the wireless LAN base station and the wireless LAN terminal before the association perform the uplink multi-user communication in stages comprising a first stage and a second stage,
   in the communication in the first stage,
      the wireless LAN terminal before the association transmits, in the case where the second AID is included in the trigger frame, a buffer status indicating that there is uplink data that has not yet been transmitted to the wireless LAN base station,
   in the communication in the second stage,
      in the case where the wireless LAN terminal before the association transmits the buffer status in the communication in the first stage, the wireless LAN base station allocates the second resource unit to the wireless LAN terminal before the association, includes in the trigger frame the second AID, and transmits the trigger frame to the plurality of wireless LAN terminals.

4. A wireless Local Area Network (LAN) base station configured to perform uplink multi-user communication with a plurality of wireless LAN terminals, the wireless LAN base station comprising:
   a memory storing instructions; and
   at least one processor configured to process the instructions to:
   generate a trigger frame comprising a first association identifier (AID) which is common to wireless LAN terminals after association with the wireless LAN base station and associated with a first resource unit for random access by the wireless LAN terminals after association and a second association identifier (AID) which is common to wireless LAN terminals before association with the wireless LAN base station and associated with a second resource unit for random access by the wireless LAN terminals before association, and
   transmit the trigger frame to cause the wireless LAN terminals before the association to transmit uplink data to the wireless LAN base station using the second resource unit for random access.

5. A wireless Local Area Network (LAN) terminal configured to perform uplink multi-user communication with a wireless LAN base station, the wireless LAN terminal comprising:
   a memory storing instructions; and
   at least one processor configured to process the instructions to:
   receive, from the wireless LAN base station, a trigger frame comprising a first association identifier (AID) which is common to wireless LAN terminals after association with the wireless LAN base station and associated with a first resource unit for random access by the wireless LAN terminals after association and a second association identifier (AID) which is common to wireless LAN terminals before association with the wireless LAN base station and associated with a second resource unit for random access by the wireless LAN terminals before association;
   determine whether the trigger frame includes the second AID, and
   in a case where the second AID is included in the trigger frame and the wireless LAN terminal is not associated with the wireless LAN base station, transmit uplink data to the wireless LAN base station using the second resource unit for random access.

6. A communication method by a wireless Local Area Network (LAN) base station configured to uplink multi-user communication with a plurality of wireless LAN terminals, the method comprising:
- generating a trigger frame comprising a first association identifier (AID) which is common to wireless LAN terminals after association with the wireless LAN base station and associated with a first resource unit for random access by the wireless LAN terminals after association and a second association identifier (AID) which is common to wireless LAN terminals before association with the wireless LAN base station and associated with a second resource unit for random access by the wireless LAN terminals before association, and
- transmitting the trigger frame to cause the wireless LAN terminals before the association to transmit uplink data to the wireless LAN base station using the second resource unit for random access.

7. The communication method according to claim 6, wherein the transmitting including transmitting the trigger frame to cause the wireless LAN terminal before the association to transmit, by random access, the uplink data to the wireless LAN base station using the second resource unit for random access.

8. A communication method by a wireless Local Area Network (LAN) terminal configured to perform uplink multi-user communication with a wireless LAN base station, the method comprising:
- receiving, from the wireless LAN base station, a trigger frame comprising a first association identifier (AID) which is common to wireless LAN terminals after association with the wireless LAN base station and associated with a first resource unit for random access by the wireless LAN terminals after association and a second association identifier (AID) which is common to wireless LAN terminals before association with the wireless LAN base station and associated with a second resource unit for random access by the wireless LAN terminals before association;
- determining whether the trigger frame includes the second AID, and
- in a case where the second AID is included in the trigger frame and the wireless LAN terminal is not associated with the wireless LAN base station, transmitting uplink data to the wireless LAN base station using the second resource unit for random access.

9. The communication method according to claim 8, wherein the transmitting is performed by random access.

* * * * *

UNITED STATES PATENT AND TRADEMARK OFFICE
CERTIFICATE OF CORRECTION

PATENT NO. : 10,880,930 B2  
APPLICATION NO. : 16/080157  
DATED : December 29, 2020  
INVENTOR(S) : Leonardo Lanante, Yuhei Nagao and Hiroshi Ochi Page 1 of 1

It is certified that error appears in the above-identified patent and that said Letters Patent is hereby corrected as shown below:

In the Claims

Column 13, Line 61; In Claim 2, delete "A1D" and insert --AID-- therefor

Column 14, Line 7; In Claim 3, delete "A1D" and insert --AID-- therefor

Column 16, Line 18; In Claim 8, delete "A1D" and insert --AID-- therefor

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*